Patented Sept. 11, 1934

1,973,380

UNITED STATES PATENT OFFICE 1,973,380

PROCESSING GLYCERIN LYES

John J. Healy, Jr., Newton, Mass., assignor to Merrimac Chemical Company, Inc., Everett, Mass., a corporation of Massachusetts No Drawing. Application November 28, 1931, Serial No. 577,861

2 Claims. (Cl. 87—4)

This invention relates to the recovery of glycerin from the glycerin lyes which are obtained as a by-product in the manufacture of soap.

Glycerin lyes consist essentially of glycerin, water and free alkali together with appreciable quantities of soap. Heretofore, it has been common practice to neutralize the glycerin lyes by the addition of muriatic acid and subsequently precipitate the soap by adding aluminum sulfate. The chemical effect of the addition of aluminum sulfate may be represented as follows:

6 alkali fatty acids $+ Al_2(SO_4)_3 \rightarrow$ 2Al fatty acid (ppt.) $+ 3Na_2SO_4$.

The water solution obtained after separation of the insoluble materials contains the alkali chloride, alkali sulfate, glycerin, and water. The water is evaporated to recover the glycerin, and at the same time separate the salts as a mixed crystalline product. It is common practice to make use of this mixture after saponification for salting out the soap from a glycerin solution. For this purpose the valuable component is the alkali chloride. However, in the presence of increasing amounts of alkali sulfate it becomes increasingly less effective for the purpose of salting out the soap. Moreover, since the alkali sulfate accumulates through reuse of the mixed crystalline product, eventually the latter becomes worthless as a salting out agent, and must be thrown away, along with any glycerin which manifests a tendency to adhere mechanically to the salts. Furthermore, in the course of the accumulation of the alkali sulfate, the efficacy of the salt mixture is reduced, thus decreasing the capacity of the equipment and reducing the normal recovery of soap sought to be separated.

These disadvantages are overcome by the present invention which avoids the use of sulfates of metals for the purpose of separating the soaps, and at the same time insures against contamination of the alkali chloride which may be re-used indefinitely without contamination arising from the use of a sulfate.

According to the present invention all the free alkali is neutralized with muriatic acid as has been the practice heretofore, whereas the free or combined fatty acids are precipitated by means of sodium aluminate or aluminum hydroxide. In practicing one embodiment of the invention, the glycerin lyes are neutralized by means of muriatic acid in the manner practiced heretofore. The soap is then precipitated by the addition of sodium aluminate. For this purpose an ordinary commercial grade of sodium aluminate may be employed. The alkali which is thus introduced is neutralized conveniently by means of additional muriatic acid. The aluminum soap thereby precipitated is separated from the liquid fraction in the usual manner, after which the glycerin is evaporated and the alkali chloride separated therefrom. The alkali chloride which is separated in the course of the evaporation may be employed as a salting out agent. Moreover, inasmuch as it is not contaminated by sodium sulfate or other inert or deleterious ingredients, its efficiency is maintained at a maximum, and the necessity for throwing away the salt periodically is obviated.

Alternatively, sodium aluminate or aluminum hydroxide is added to the glycerin lye after which muriatic acid is added to neutralize the resulting mixture and precipitate the soap. The precipitated soap is separated and the glycerin and salt are recovered in the usual manner.

From the foregoing description, it should be apparent that the present invention affords an effective means for recovering the values from glycerin lyes which assures uniformity of operation, improved efficiency, and elimination of waste. It should likewise be apparent that although but a single embodiment of the invention has been set forth, it is not so limited, but contemplates broadly the preparation of soaps from glycerin lyes by the addition of a basic aluminum compound such as aluminum hydrate or sodium aluminate, which is substantially free of sulfates.

What I claim is:

1. In the processing of glycerin lyes in which the free inorganic base is first neutralized with muriatic acid, the steps which include precipitating the fatty acid by adding sodium aluminate to the neutralized mixture, separating the precipitated soap, and finally recovering and separating glycerin and sodium chloride.

2. In the processing of glycerin lyes in which the free inorganic base is first neutralized with muriatic acid, the steps which include precipitating the fatty acid as an aluminum soap by adding sodium aluminate to the neutralized mixture, subsequently neutralizing any residual alkali by means of additional muriatic acid, separating the precipitated soap, and finally recovering and separating glycerin and sodium chloride.

JOHN J. HEALY, Jr.